US009157468B2

(12) United States Patent
Dille et al.

(10) Patent No.: US 9,157,468 B2
(45) Date of Patent: Oct. 13, 2015

(54) PACKING NUT LOCK AND METHOD OF USE

(75) Inventors: Mark Christopher Dille, Fort Worth, TX (US); Wesley David Freed, Fort Worth, TX (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 661 days.

(21) Appl. No.: 13/152,076

(22) Filed: Jun. 2, 2011

(65) Prior Publication Data
US 2011/0296982 A1 Dec. 8, 2011

Related U.S. Application Data

(60) Provisional application No. 61/351,537, filed on Jun. 4, 2010.

(51) Int. Cl.
*F15B 15/20* (2006.01)
*F16B 39/10* (2006.01)

(52) U.S. Cl.
CPC ......... *F16B 39/103* (2013.01); *Y10T 29/49947* (2015.01)

(58) Field of Classification Search
CPC .................................................... F16B 39/103
USPC ............. 411/315–318, 209–211; 403/16, 21, 403/316, 320, 325, 328; 81/176, 179, 81/176.1, 176.15, 176.3; 92/165 PR, 165 R, 92/169.1; 417/269, 273
See application file for complete search history.

(56) References Cited

U.S. PATENT DOCUMENTS

| 1,105,606 | A |   | 8/1914  | Beach                   |
|-----------|---|---|---------|-------------------------|
| 1,379,606 | A | * | 5/1921  | Ashley ............. 411/87  |
| 1,404,023 | A | * | 1/1922  | Hare ............... 411/318 |
| 1,544,627 | A | * | 7/1925  | Bateman .......... 411/87   |
| 1,718,408 | A | * | 6/1929  | Brawner ......... 411/209  |
| 2,316,956 | A | * | 4/1943  | Heath .............. 70/180   |
| 3,046,070 | A | * | 7/1962  | Gearhart ......... 92/163   |
| 4,084,630 | A | * | 4/1978  | Lewis ............. 411/209  |
| 4,269,221 | A | * | 5/1981  | Adams ............ 137/383  |
| 4,557,441 | A |   | 12/1985 | Aspinall                 |
| 5,597,278 | A | * | 1/1997  | Peterkort ........ 411/134  |
| 6,295,899 | B1| * | 10/2001 | Lee ................ 81/179   |
| 7,052,334 | B1|   | 5/2006  | Cabay et al.            |

(Continued)

FOREIGN PATENT DOCUMENTS

JP    2008159019    6/1996
JP    2004-162646 A  6/2004

(Continued)

OTHER PUBLICATIONS

International Search Report and Written Opinion issued in PCT Application No. PCT/US11/39179, dated Dec. 22, 2011 (9 pages).

(Continued)

*Primary Examiner* — Dwayne J White
*Assistant Examiner* — Matthew Wiblin
(74) *Attorney, Agent, or Firm* — Gardere Wynne Sewell LLP

(57) ABSTRACT

An apparatus for preventing a threaded nut from unscrewing from a threaded bore of a device. The threaded nut has a circular periphery containing a plurality of apertures. The apparatus has a body with a first pin configured to insert into one of the apertures of the threaded nut, and a retainer that releasably holds the first pin within the aperture.

15 Claims, 13 Drawing Sheets

(56) References Cited

U.S. PATENT DOCUMENTS

| | | |
|---|---|---|
| 7,290,560 B2 | 11/2007 | Orr et al. |
| 7,335,002 B2 | 2/2008 | Vicars |
| 7,364,412 B2 | 4/2008 | Kugelev et al. |
| 7,367,766 B2 | 5/2008 | Dao et al. |
| 7,404,704 B2 | 7/2008 | Kugelev et al. |
| 7,506,574 B2 | 3/2009 | Jensen et al. |
| 7,650,920 B2 | 1/2010 | Koivula |
| 8,402,880 B2 | 3/2013 | Patel et al. |
| 2005/0201881 A1 | 9/2005 | Jensen et al. |
| 2009/0236387 A1 | 9/2009 | Simonelli et al. |
| 2010/0090409 A1* | 4/2010 | Sridhar et al. .......... 277/308 |
| 2010/0143163 A1* | 6/2010 | Patel et al. .......... 417/313 |
| 2010/0158727 A1 | 6/2010 | Hawes et al. |

FOREIGN PATENT DOCUMENTS

| | | |
|---|---|---|
| KR | 1019990079544 | 11/1999 |
| KR | 1020010014520 | 2/2001 |
| KR | 100389013 B1 | 6/2003 |
| KR | 1020080008442 | 1/2008 |
| WO | WO-2008137515 A1 | 11/2008 |
| WO | WO-2010068734 A2 | 6/2010 |
| WO | WO-2010080625 A2 | 7/2010 |
| WO | WO-2011153506 A2 | 12/2011 |

OTHER PUBLICATIONS

International Search Report and Written Opinion for Application No. PCT/US2009/067466 mailed on Jun. 16, 2010, 6 pages.
International Search Report and Written Opinion for Application No. PCT/US2009/068773 mailed on Jul. 27, 2010, 6 pages.
International Search Report and Written Opinion for Application No. PCT/US2010/039651 mailed on Feb. 24, 2011, 7 pages.
Notice of Allowance mailed Dec. 18, 2012, by the USPTO re U.S. Appl. No. 12/635,390.
Office Action mailed May 7, 2013, by the USPTO, re U.S. Appl. No. 12/642,006.
Tool Engineers Handbook, McGraw Hill Book Co, 1949, pp. 1645, 1658.

* cited by examiner

Prior Art

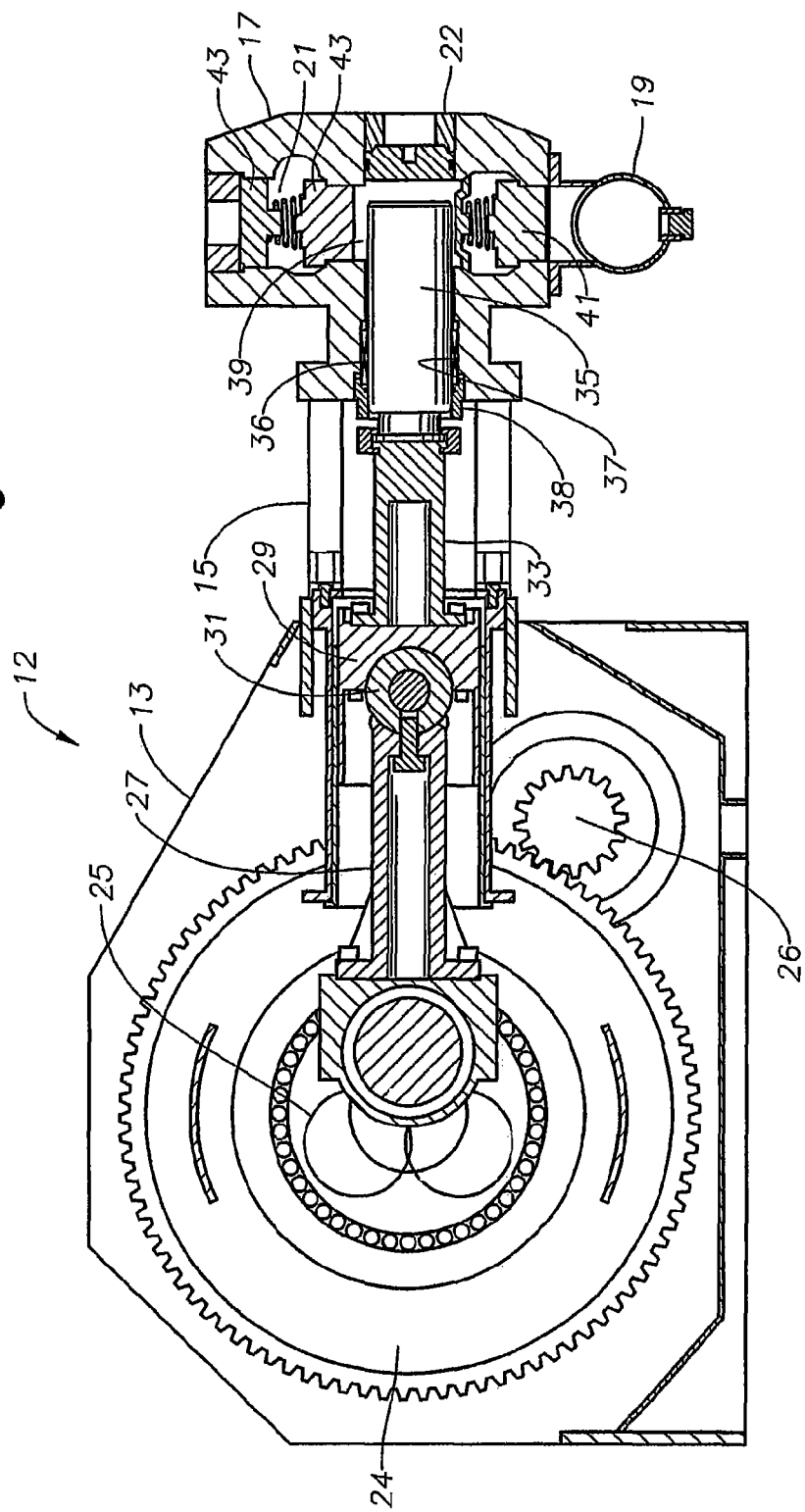

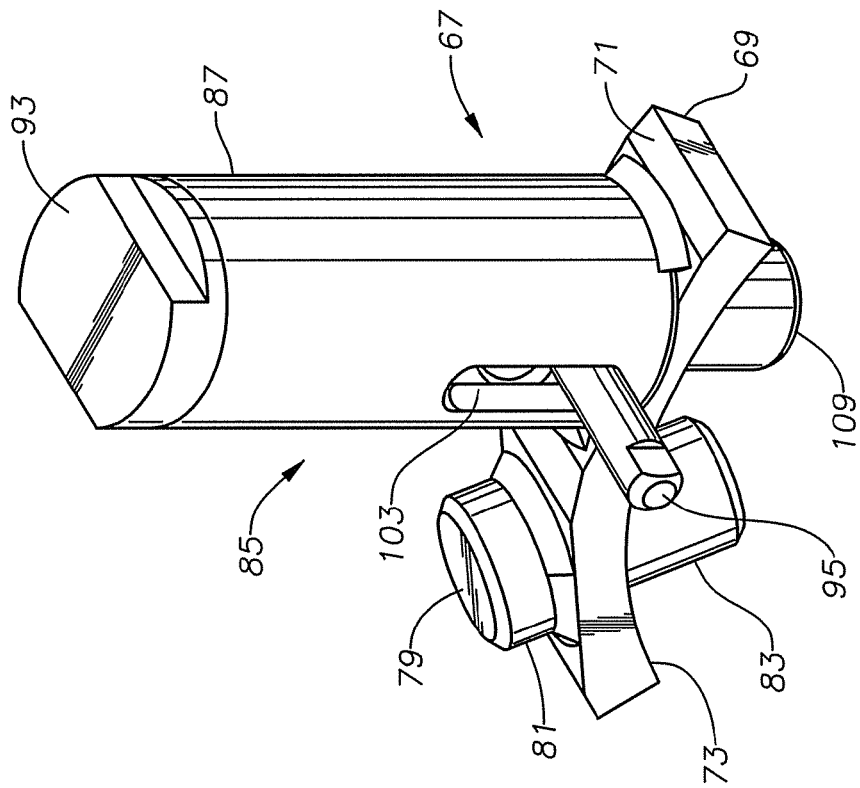
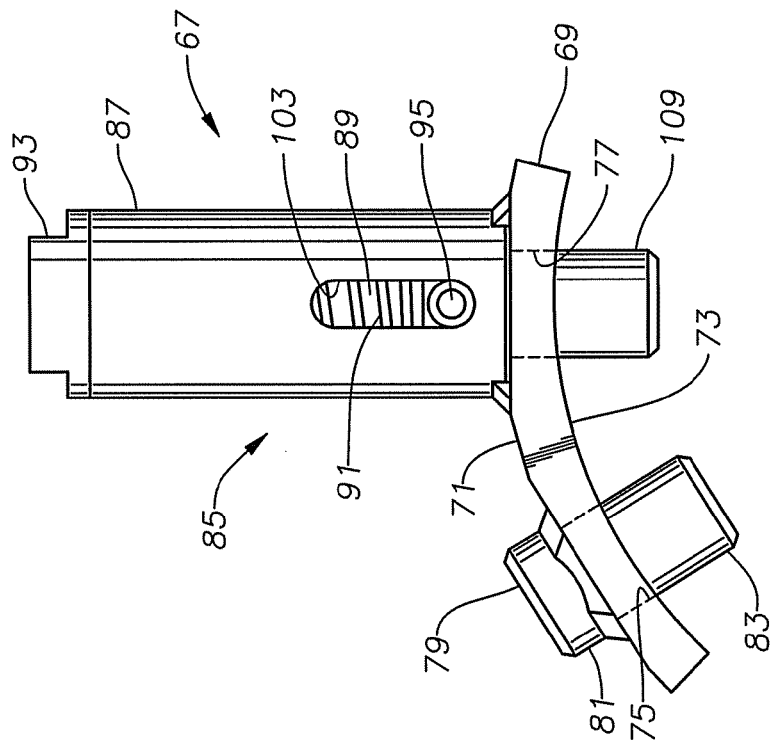

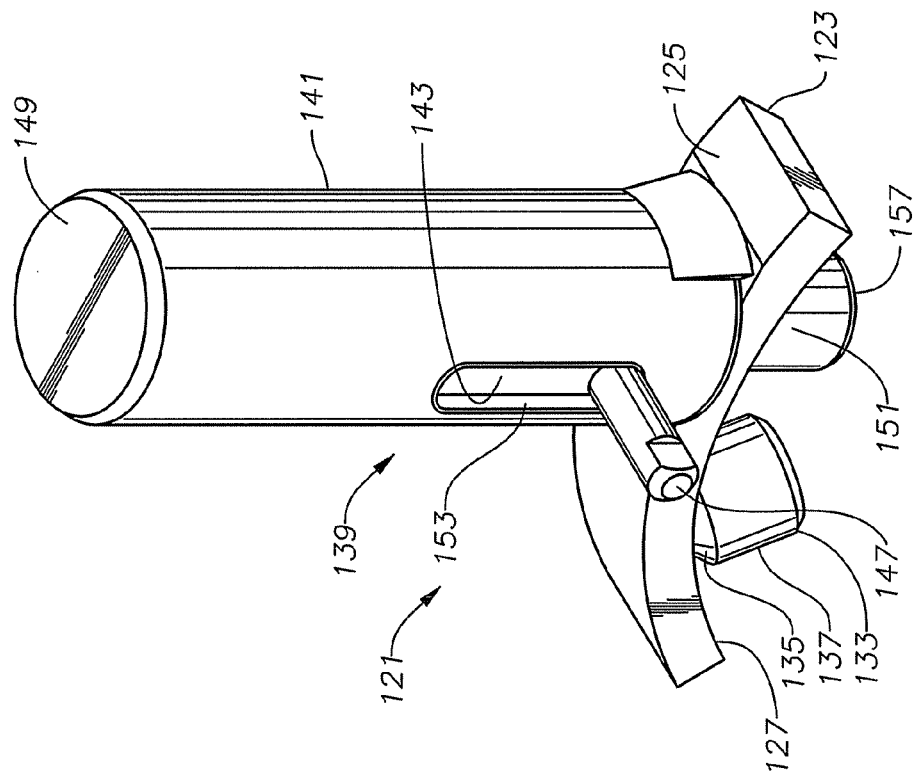
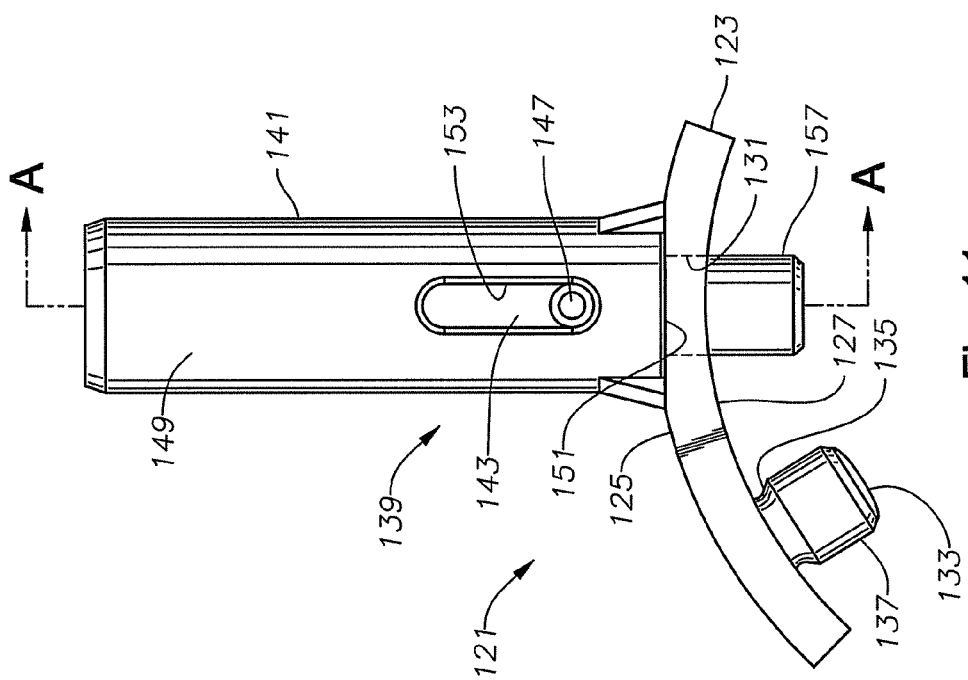

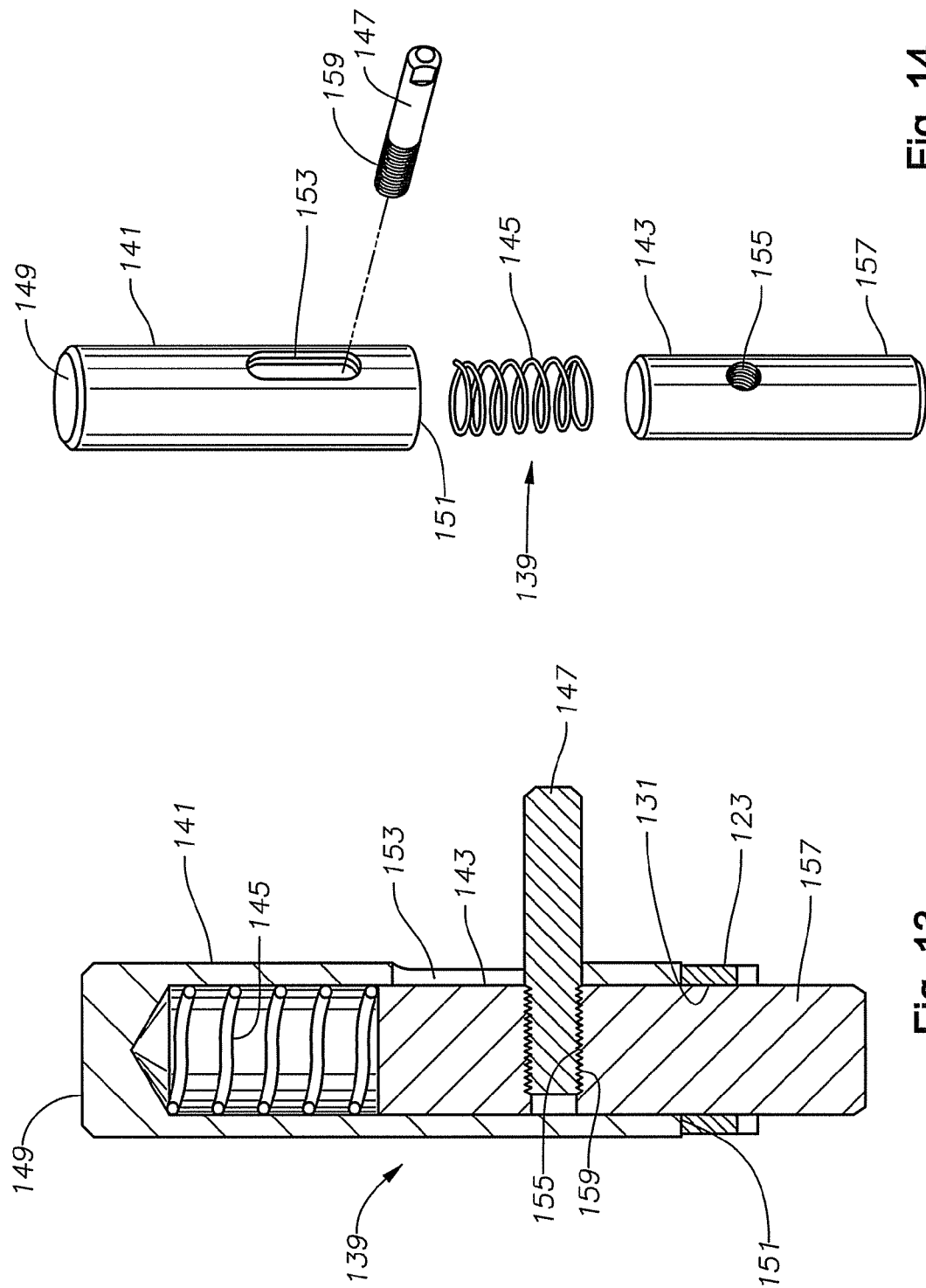

PACKING NUT LOCK AND METHOD OF USE

CROSS REFERENCE TO RELATED APPLICATIONS

This application claims the benefit of and priority to U.S. Provisional Patent Application No. 61/351,537, filed on Jun. 4, 2010, and herein incorporated by reference in its entirety.

TECHNICAL FIELD

This disclosure relates in general to reciprocating pumps, and in particular, to a packing nut lock for a reciprocating pump.

BACKGROUND OF THE DISCLOSURE

In oil field operations, reciprocating pumps are often used for various purposes. Some reciprocating pumps, generally known as "service pumps," are typically used for operations such as cementing, acidizing, or fracing a well. Typically, these service pumps run for relatively short periods of time, but they operate on a frequent basis. Often they are mounted to a truck or a skid for transport to various well sites. A pump might operate several times a week. In many applications, several pumps are connected in parallel to a single flow line.

High pressure pumps are widely used in the petroleum industry for a variety of field operations relating to oil and gas wells. Such pumps deliver a fluid or slurry, which may carry solid particles (e.g., a sand proppant), at pressures up to 20,000 psi. A common type is a positive displacement pump having one or more plungers reciprocally movable in a corresponding pump chamber. Each chamber has an intake port for receiving fluid, a discharge port for exhaust, and a one-way flow valve in each port for preventing reverse flow. These valves require frequent maintenance.

With the many different ports and chambers in a high pressure pump, it is advantageous to ensure that threaded assemblies are securely threaded into the corresponding bores of the pump assembly. Unfortunately, many of these threaded assemblies are prone to inadvertently loosen. The pump experiences substantial vibration during operation at high power settings such that the threaded assemblies may overcome their initially applied torque and begin to "back out", or rotate in a loosening direction. With respect to many of the threaded assemblies, should the assemblies continue to loosen, the closure, and in some instances, a quantity of high pressure fluid may be ejected from the pump housing and potentially cause damage or injury. Consequently, safety regulations demand that operators respond to any loosening of threaded assemblies by stopping the pump. That degrades efficiency and can necessitate the expense of a back-up pump for continuing a pumping operation while the primary pump is shut down.

SUMMARY

In a first aspect, embodiments are disclosed of an apparatus for preventing a threaded nut from unscrewing from a threaded bore of a device, the nut having a circular periphery containing a plurality of apertures, the apparatus comprising a body having a first pin configured to insert into one of the apertures of the nut; and a retainer that releasably holds the first pin within the aperture.

The apparatus releasably engages the threaded nut and prevents the threaded nut from rotating relative to the device, and thus prevents the threaded nut from loosening and backing out of the threaded bore.

In certain embodiments, the apparatus may further comprise a shank extending outward from and rigidly attached to the body and adapted to engage a non-rotatable portion of the device.

In certain embodiments, the apparatus may further comprise a substantially circumferentially planar surface on an outer end of the shank, opposite the body, the substantially circumferentially planar surface adapted to transfer a rotational force to the nut.

In certain embodiments, the retainer may comprise a second pin extending from the body at an angle relative to the first pin for engaging another aperture in the nut, and one of the pins is retractable relative to the body.

In certain embodiments, the pins may be at an acute angle to one another.

In certain embodiments, the apparatus may further comprise a resilient member mounted in engagement with the retractable pin to thereby bias the retractable pin toward an engaged position.

In certain embodiments, the second pin may have an axis that intersects the axis of the first pin.

In certain embodiments, the axis of the first pin and the axis of the second pin can be located in a single plane.

In certain embodiments, the retainer may comprise a second pin extending from the body at an angle relative to the first pin for engaging another aperture in the nut; one of the pins being retractable relative to the body, wherein the second pin may have an axis that intersects the axis of the first pin, and the axis of the first pin and the axis of the second pin are located in a single plane.

In a second aspect, embodiments are disclosed of an apparatus for preventing a threaded nut from unscrewing from a threaded bore of a device, the nut having a circular periphery containing a plurality of apertures, the apparatus comprising a body having a first pin configured to insert into one of the apertures of the nut and a second pin extending from the body at an angle relative to the first pin for engaging another aperture in the nut, one of the pins being retractable relative to the body, the second pin having an axis that intersects the axis of the first pin, and the axis of the first pin and the axis of the second pin being located in a single plane, and a shank extending outwardly from and being rigidly attached to the body and adapted to engage a non-rotatable portion of the device, the shank having an axis that intersects the axes of the first pin and the second pin, and the shank axis and the axes of the first and second pin are located in a single plane.

The apparatus releasably engages the threaded nut. If the threaded nut begins to rotate relative to the device, the shank makes contact with a non-rotatable portion of the device, thereby preventing the apparatus from rotating relative to the device, and thus, also preventing the threaded nut from rotating any further relative to the device. The apparatus thus prevents the threaded nut from loosening and backing out of the threaded bore. In certain embodiments, the axes of the pins can be at an acute angle to one another.

In certain embodiments, the retractable pin may further comprise a resilient member housed within the shank and in engagement with the retractable pin to thereby bias the retractable pin toward an engaged position.

In certain embodiments, the apparatus may further comprise a substantially circumferentially planar surface on an outer end of the shank, opposite the body, the substantially circumferentially planar surface adapted to transfer a rotational force to the nut.

In a third aspect, embodiments are disclosed of a reciprocating pump assembly comprising a reciprocating pump having a housing, a threaded nut in engagement with a threaded bore in the reciprocating pump housing, an apparatus for retaining the threaded nut in engagement with the threaded bore in the reciprocating pump housing, the apparatus having a body with a portion in releasable engagement with the nut and a retainer that releasably retains the body in engagement with the nut, and a shank extending from the body and adapted to engage a non-rotatable portion of the reciprocating pump to prevent rotation of the body relative to the pump housing, which in turn, prevents the threaded nut from rotating relative to the pump housing.

In certain embodiments, the bore may have a bore axis and the threaded nut has a circular periphery containing a plurality of apertures located in and spaced around the periphery, each of the apertures having an aperture axis that intersects the bore, the apparatus comprising a first pin extending from the body along one of the aperture axes and into one of the apertures, and the retainer comprises a second pin extending along another one of the aperture axes and into another one of the apertures.

In certain embodiments, the first and second pins may be at an acute angle to one another.

In certain embodiments, the first pin may be retractable.

In certain embodiments, the retractable pin may further comprise a resilient member housed within the shank and in engagement with the retractable pin to thereby bias the retractable pin toward an engaged position.

In a fourth aspect, embodiments are disclosed of a method for preventing a threaded nut from unscrewing from a threaded bore of a device, the nut having a circular periphery containing a plurality of apertures, the method comprising the steps of providing a body with a pin, inserting the pin into one of the apertures, retaining the body and the pin with the nut, and transferring any forces due to a tendency of the nut to unscrew to a fixed portion of the device.

In certain embodiments, the method may further comprise rotating the nut, body, and pin in an unscrewing direction until a protruding portion of the body contacts a fixed portion of the device, thereby preventing further rotation of the nut in the unscrewing direction.

Other aspects, features, and advantages will become apparent from the following detailed description when taken in conjunction with the accompanying drawings, which are a part of this disclosure and which illustrate, by way of example, principles of any disclosures disclosed.

DESCRIPTION OF THE FIGURES

The accompanying drawings facilitate an understating of the various embodiments.

FIG. 3 is a sectional view of the pump assembly shown in FIG. 1;

FIG. 4 is a front plan view of a packing nut lock in accordance with the present disclosure;

FIG. 5 is a perspective view of the packing nut lock of FIG. 4;

FIG. 11 is a front plan view of a packing nut lock in accordance with an alternate embodiment of the present disclosure;

FIG. 12 is a perspective view of the packing nut lock of FIG. 11; and

FIG. 13 is a sectional view of the packing nut lock in accordance with an alternate embodiment of the present disclosure, and taken along the line A-A of FIG. 11.

FIG. 14 is an exploded view of a spring pin assembly in accordance with an alternate embodiment of the present disclosure;

DETAILED DESCRIPTION

Figure 1:
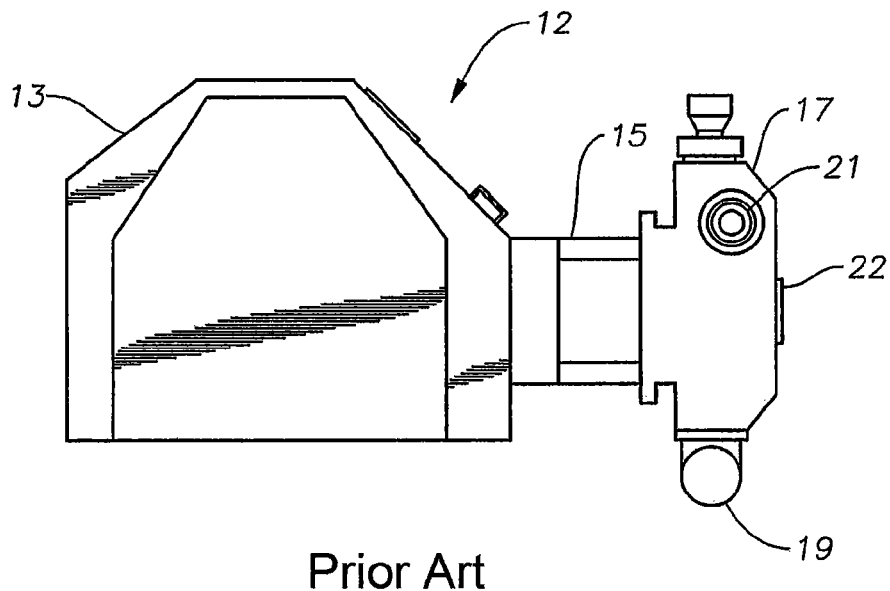
FIG. 1 is an elevational view of a reciprocating pump assembly.
Figure 2:
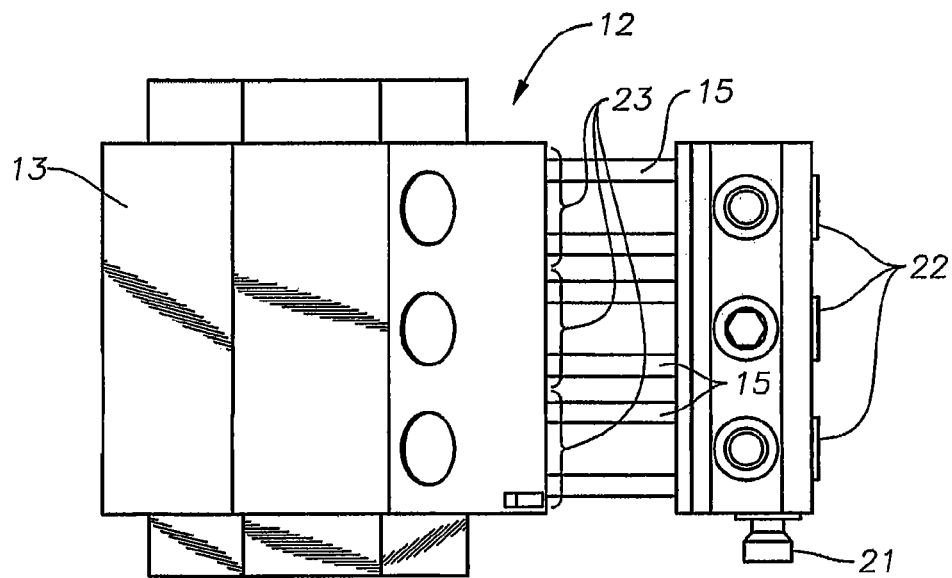
FIG. 2 is a top plan schematic view of the reciprocating pump assembly of FIG. 1.

Referring to FIGS. 1 and 3, a reciprocating pump assembly or pump 12 includes a crankshaft housing 13 that comprises the outer surface of the reciprocating pump 12. A plurality of stay rods 15 attach to a side of the crankshaft housing 13 and extend to a fluid cylinder housing 17. Each cylinder typically includes a fluid inlet 19 and a fluid outlet 21. As best shown in FIGS. 1 through 3, an access bore cover 22 connects to an end of the cylinder housing 17, opposite the plurality of stay rods 15. The pump 12 can easily be mounted to a trailer that can be towed between operational sites, or to a skid for use in offshore operations. Accordingly, a pump assembly may include the pump 12 mounted directly to the ground or a support structure, a skid, a trailer, etc.

Referring to FIG. 2, the plurality of stay rods 15 are segmented into three portions, each portion having multiple stay rods 15, and each portion comprising a plunger throw 23. The reciprocating pump 12 (as shown in FIG. 2) has three plunger throws 23, a configuration which is commonly known as a triplex pump, but the stay rod can also be segmented for five plunger throws, a configuration which is commonly known as a quintuplex pump. The present description is directed to a triplex pump, but as will be readily apparent to those skilled in the art, the features and aspects described are easily applicable for a quintuplex pump or other types of pumps. Each plunger throw 23 houses a plunger or pony rod 33 (FIG. 3) that extends to the cylinder housing 17. As shown in FIG. 2, each of the plunger throws 23 extend in the same longitudinal direction as each other from the crankshaft housing 13.

Referring to FIG. 3, a portion of the reciprocating pump 12 that is housed within the crankshaft housing 13 is shown. The crankshaft housing 13 houses a crankshaft 25, which is typically mechanically connected to a motor (not shown). The motor rotates the crankshaft 25 in order to drive the reciprocating pump 12. In one embodiment, the crankshaft 25 is cammed so that fluid is pumped from the cylinder housing 17 at alternating times. As will be readily apparent by those skilled in the art, alternating the cycles of pumping fluid from the cylinder housing 17 helps minimize the primary, secondary, and tertiary (et al.) forces associated with the reciprocating pump 12.

In one embodiment, a gear 24 is mechanically connected to the crankshaft 25 and is rotated by the motor through a gear 26. A connector rod 27 connects to a crosshead 29 through a crosshead pin 31, which holds the connector rod 27 laterally relative to the crosshead 29. The connector rod 27 pivots about the crosshead pin 31 as the crankshaft 25 rotates with the other end of the connector rod 27. The pony rod 33 extends from the crosshead 29 in a longitudinally opposite direction from the connector rod 27. The connector rod 27 and the crosshead 29 convert rotational movement of the crankshaft 25 into longitudinal movement of the pony rod 33.

A plunger 35 is connected to the pony rod 33 for pumping the fluid which passes through the cylinder housing 17 during operation of the pump 12. A packing 36 surrounds the plunger 35. A packing nut 38 is threaded into the cylinder housing 17, and acts to maintain the packing 36 in the proper position within the packing bore 37. A number of holes or apertures 40 (FIGS. 7, 8, and 10) extend along the outer diameter of the rim of the packing nut 38. The holes 40 are for engagement by a spanner to tighten and loosen the packing nut 38. When properly positioned, the packing 36 and the packing nut 38 maintain the necessary pressure between the plunger 35 and the packing 36, and prevent the packing bore 37 from leaking.

The cylinder housing 17 connects to the ends of the stay rods 15, extending away from the crankshaft housing 13 (FIG. 1). The cylinder housing 17 includes a plurality of interior or cylinder chambers 39, which is where the plungers 35 compress the fluid being pumped by the reciprocating pump 12. The cylinder housing 17 also typically includes an inlet valve 41 and an outlet valve 43. The valves 41, 43 are usually spring-loaded valves and are actuated by a predetermined differential pressure. The inlet valve 41 actuates to control fluid flow through the fluid inlet 19 into the cylinder chamber 39, and the outlet valve 43 actuates to control fluid flow through the fluid outlet 21 from the cylinder chamber 39. Other valve arrangements and configurations of the fluid end of equivalent functionality are envisaged.

The plunger 35 reciprocates, or moves longitudinally toward and away from the cylinder housing 17 as the crankshaft 25 rotates. As the plunger 35 moves longitudinally away from the cylinder chamber 39, the pressure of fluid inside the chamber 39 decreases, creating a differential pressure across the inlet valve 41, which actuates the valve 41 and allows the fluid to enter the cylinder chamber 39 from the fluid inlet 19. The fluid being pumped enters the cylinder chamber 39 as the plunger 35 continues to move longitudinally away from the cylinder housing 17 until the pressure difference between the fluid inside the cylinder chamber 39 and the fluid in the fluid inlet 19 is small enough for the inlet valve 41 to actuate its closed position. On the return stroke as the plunger 35 begins to move longitudinally towards the cylinder housing 17, the pressure on the fluid inside of the cylinder chamber 39 begins to increase. Fluid pressure inside the cylinder chamber 39 continues to increase as the plunger 35 approaches the cylinder housing 17 until the differential across the outlet valve 43 is large enough to actuate the outlet valve 43 and allow the fluid to exit the cylinder housing 17 through the fluid outlet 21. In one embodiment, fluid is only pumped across one side of the plunger 35; therefore, the reciprocating pump 12 is a single-acting reciprocating pump. As the operation of the pump 12 is conventional, it will not be described in further detail. During operation of the pump 12, vibration and reciprocating forces from the plunger 35 may cause the packing nut 38 to loosen or back out. As the packing nut 38 backs out, the packing 36 is affected, which may result in pressure differentials and leakage of fluid from the packing bore 37.

Figure 7:
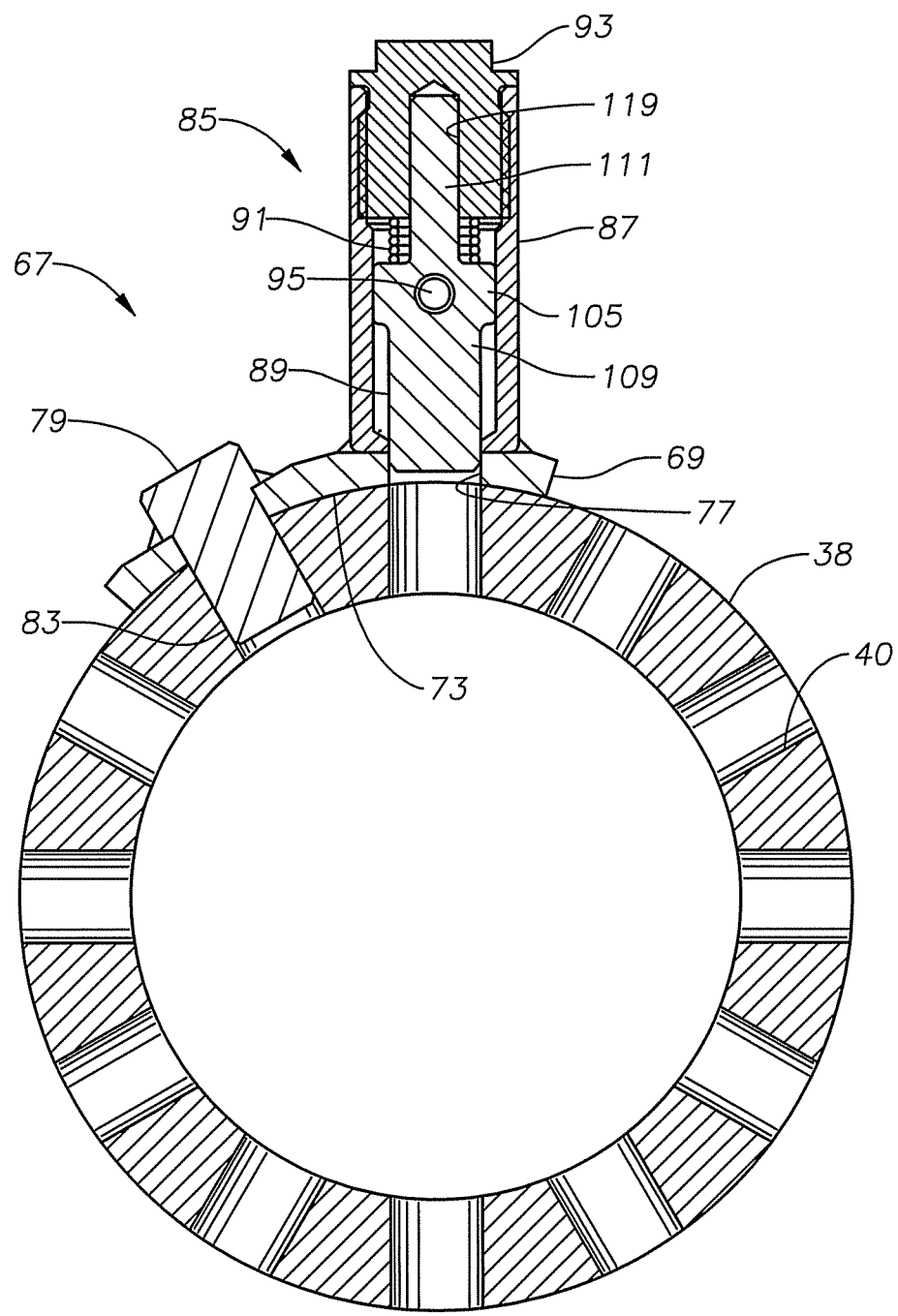
FIG. 7 is a sectional view of a portion of a reciprocating pump assembly in accordance with the present disclosure, with a packing nut lock installed in a disengaged position.
Figure 8:
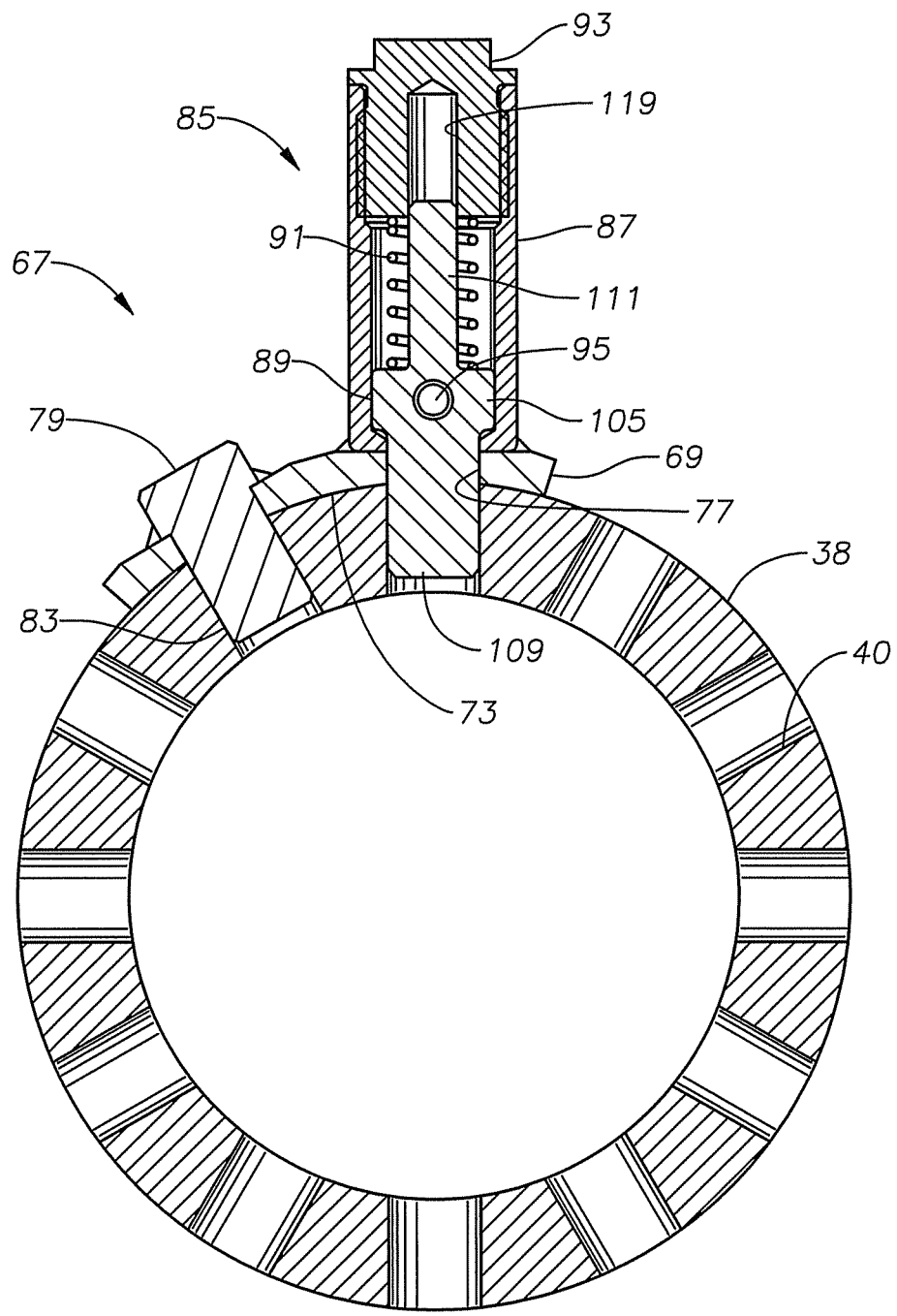
FIG. 8 is a sectional view of a portion of a reciprocating pump assembly in accordance with the present disclosure, with a packing nut lock installed in an engaged position.

Referring to FIGS. 4 and 5, in this embodiment, a packing nut lock 67 is comprised of a main body 69 having a generally elongate, arcuate shape. In this embodiment, the main body 69 generally subtends an angle of around one sixth of a circle and has a top surface 71 and a bottom surface 73. The bottom surface 73 of the main body 69 is substantially geometrically complimentary to the rim of the packing nut 38 and is adapted to be in abutting contact with a portion of the outer diameter of the rim of the packing nut 38 (FIGS. 7 and 8). Two apertures 75, 77 are located in and extend through opposite end portions of the main body 69, with each aperture 75, 77 extending from the top surface 71 through to the bottom surface 73. In this embodiment, a fixed cylindrical pin 79 having an upper flange portion 81 with a greater diameter than a lower portion 83, is inserted into and passes through one of the apertures 75. In this embodiment, the cylindrical pin 79 is welded to the main body 69. However, in additional embodiments, the cylindrical pin 79 may be cast as one member with main body 69, or may be connected to main body 69 by other means. The lower portion 83 of the fixed cylindrical pin 79 is adapted to be inserted into one of the holes 40 that extend around the outer diameter of the rim of packing nut 38, when the packing nut lock 67 is engaged (FIG. 8).

Although the packing nut 38 illustrated with the current embodiment is circular in shape, the packing nut 38 may have alternative shapes. For example, the packing nut 38 may be hexagonal, square, etc., in additional embodiments. In such additional embodiments, the main body 69 of the packing nut lock 67 may be shaped to be geometrically complimentary to the shape of the packing nut 38. For example, if the packing nut 38 were hexagonal in shape, the main body 69 of the packing nut lock 67 would be geometrically complimentary to the hexagonal shape of the packing nut 38.

Figure 6:
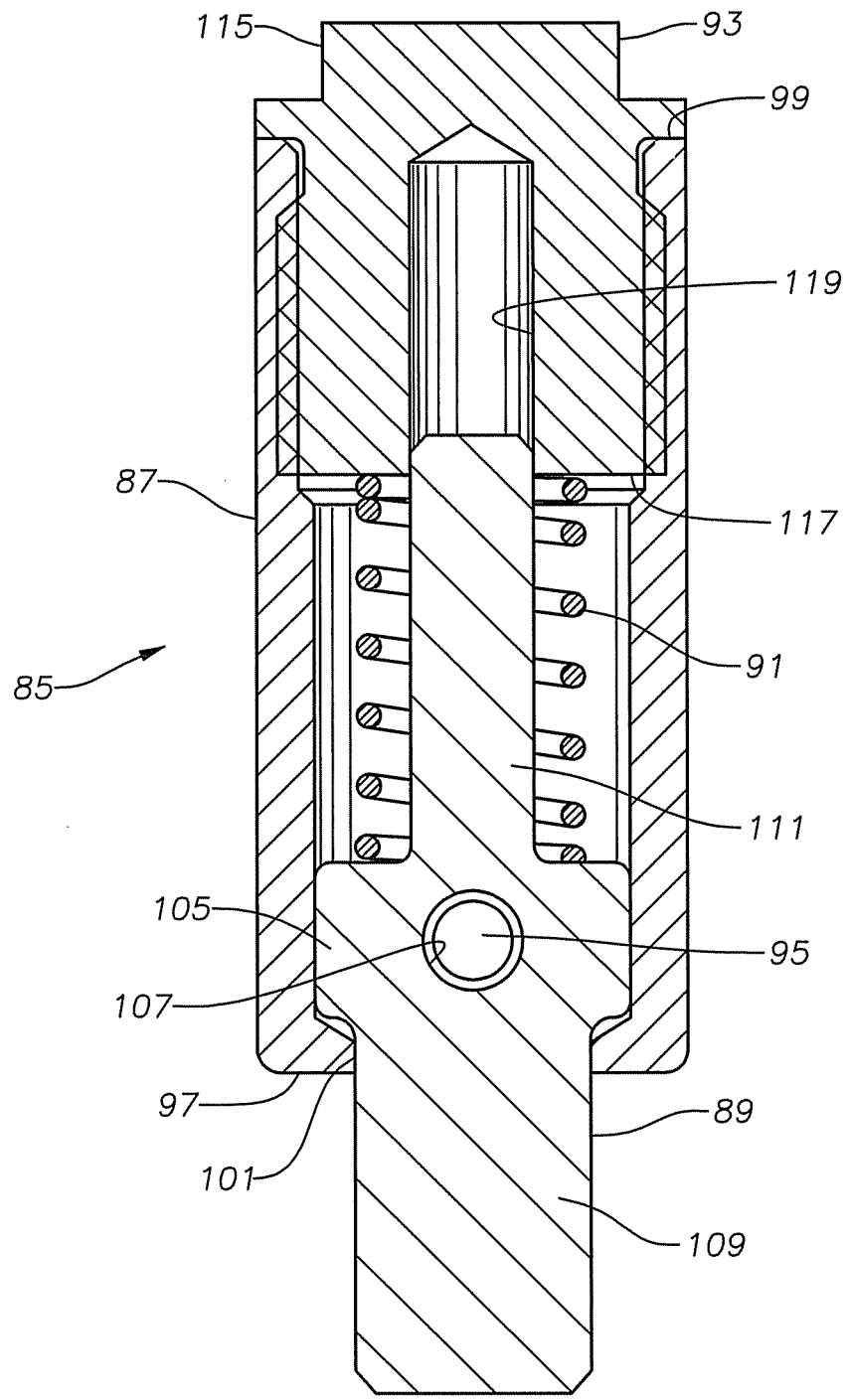
FIG. 6 is a spring pin assembly in accordance with the present disclosure.

A spring pin assembly 85 is connected to the top surface 71 of the main body 69, above the other aperture 77. Referring to FIG. 6, the spring pin assembly 85 is comprised of a collar 87, a center pin 89, a resilient member or spring 91, a retaining nut 93, and a handle 95. In this embodiment, the collar 87 is a hollow bodied cylindrical member having a closed end 97 and an open end 99. The closed end 97 of the collar 87 has an aperture 101 located in and extending therethrough that is aligned with the apertures 77 in the main body 69. In this embodiment, the collar 87 is welded to the main body 69. However, in additional embodiments, the collar 87 may be cast as one member with the main body 69, or may be connected to the main body 69 by other means. In this embodiment, the inner surface of the open and 99 of the collar 87 has threads located therein. An elongated aperture or slot 103 is located in and extends through the cylindrical collar 87 along the portion of its outer surface.

The center pin 89 has a cylindrical medial flange portion 105 having a diameter that is slightly less than the inner diameter of the collar 87, such that the center pin 89 is positioned within the collar 87. In this embodiment, a threaded aperture 107 is located in and extends through the medial flange portion 105 of the center pin 89, substantially perpendicular to the axis of the center pin 89. A cylindrical locking pin portion 109 of the center pin 89 has a smaller diameter than the flange portion 105 and extends axially downward therefrom. The locking pin portion 109 of the center pin 89 is adapted to be inserted into one of the holes 40 that extend along the outer diameter of the rim of the packing nut 38 when the packing nut lock 67 is engaged (FIG. 8). A cylindrical guide pin portion 111 of the center pin 89 has a diameter which is smaller than the flange portion 105 and smaller than the locking pin portion 109, and extends axially upward from the flange portion 105, in a direction opposite to the locking pin portion 109.

Although the holes 40 of the packing nut 38 illustrated with the current embodiment are circular in shape, the holes 40 may have alternative shapes. For example, the holes 40 may be hexagonal, square, etc. in additional embodiments. In such additional embodiments, the fixed pin 79 and the center pin 89 may be shaped to be geometrically complimentary to the shape of the holes 40 in the packing nut 38. For example, if the holes 40 of the packing nut 38 were hexagonal in shape, the fixed pin 79 and the center pin 89 of the packing nut lock 67 would be geometrically complimentary to the hexagonal shape of the holes 40 of the packing nut 38.

Figure 9:
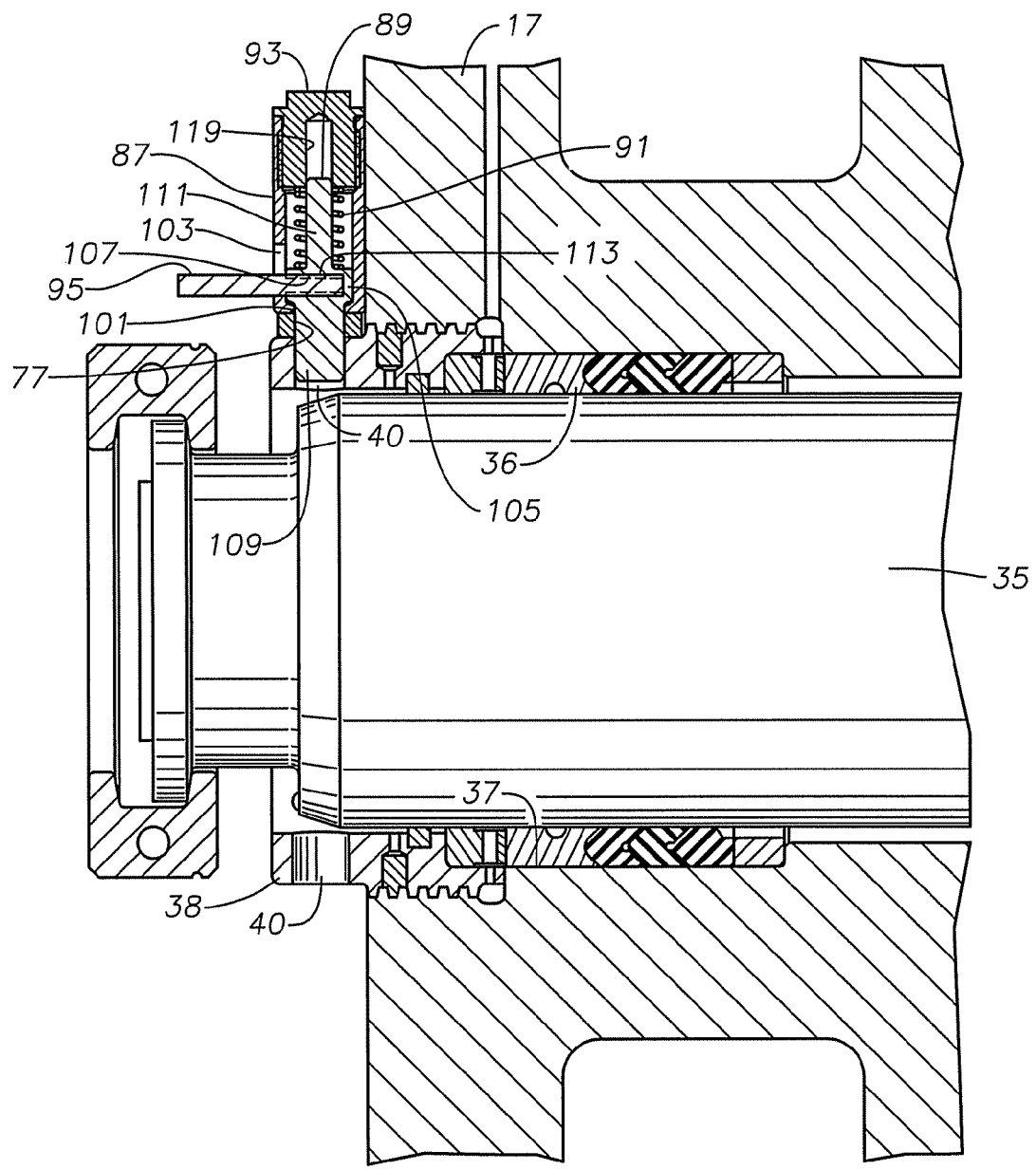
FIG. 9 is a sectional view of a portion of a reciprocating pump assembly in accordance with the present disclosure, with a packing nut lock installed in an engaged position.

Referring to FIG. 9, in this embodiment the handle 95 is cylindrical and has threads located in the exterior surface of one of its ends 113. The threaded end 113 of the handle 95 threadingly engages with the threaded aperture 107 in the flange portion 105 of the center pin 89, thereby connecting the handle 95 and the center pin 89. The handle 95 extends radially outwardly from the flange portion 105 of the center pin 89 and also passes through the elongated aperture or slot 103 in the collar 87. The handle 95 extends a desired distance radially outward from the collar 87. The handle 95 is adapted to move vertically within the aperture 103 of the collar 87 to thereby move the center pin 89, and in particular the locking pin portion 109, from an engaged position to a disengaged position.

The cap or retaining nut 93 has a first end 115 and a second end 117. In this embodiment, the retaining nut 93 is cylindrical and has threads on its exterior surface that are threadably engaged with the threads on the inner surface of the open end 99 of the collar 87. The retaining nut 93 thereby seals or caps the open end 99 of the collar 87 when the two are connected to one another. The second end 117 of the retaining nut 93 has an aperture 119 located therein with a diameter slightly larger than the diameter of the guide pin portion 111 of the center pin 89. The guide pin portion 111 of the center pin 89 is captured within the aperture 119 of the retaining nut 93. As the center pin 89, and in particular, the locking pin portion 109 is moved vertically upward from an engaged position to a disengaged position, the guide pin portion 111 of the center pin 89 travels further into the aperture 119 in the retaining nut 93.

In this embodiment, the spring 91 surrounds the guide pin portion 111 of the center pin 89 and abuts against the retaining nut 93 on one end and the flange portion 105 of the center pin 89 on the other end. The spring 91 acts to bias the center pin 89 into an engaged position, with the locking pin portion 109 of the center pin 89 extending fully outward through the aperture 77 in the main body 69 (FIGS. 4 and 5).

Referring to FIG. 9, in operation, once the packing 36 has been inserted around the plunger 35 within the packing bore 37, the packing nut 38 is threaded into the body of the cylinder housing 17. Referring generally to FIG. 7, a spanner (not shown) is inserted into holes or apertures 40 on the outer diameter of the rim of the packing nut 38, and the packing nut 38 is securely tightened. The packing nut lock 67 is then connected to the packing nut 38. The fixed cylindrical pin 79 is machined so that the smaller diameter portion 83 will fit into one of the holes 40 extending around the rim of the packing nut 38. The packing nut 67 is positioned so that the smaller diameter portion 83 of the fixed cylindrical pin 79 is positioned within one of the holes 40 of the packing nut 38. The center pin 89 of the spring pin assembly 85 is positioned in a disengaged position within the collar 87 by positioning the handle 95 to its most upward position within the elongated aperture 103. Force is maintained against the handle 95 to compress the spring 91 and to allow the center pin 89 to maintain the disengaged position. The guide pin portion 111 of the center pin 89 fully enters the aperture 119 in the retaining nut 93. The main body 69 of the packing nut lock 67 is positioned so that the bottom surface 73 is in abutting contact with the outer diameter of the rim of the packing nut 38, and the aperture 77 is positioned directly above another hole 40 in the packing nut 38.

Referring generally to FIGS. 8 and 9, once the packing nut lock 67 is properly positioned, the force is removed from the handle 95 of the spring pin assembly 85, and the spring 91 expands and pushes the center pin 89 downward relative to the collar 87. The locking pin portion 109 of the center pin 89 fully extends through the aperture 77 in the main body 69 of the packing nut lock 67 and engages another hole 40 in the packing nut 38. Based on the angles of the fixed cylindrical pin 79 and the center pin 89 relative to one another within the holes 40 of the packing nut 38, the packing nut lock 67 is securely engaged with the packing nut 38, and cannot be removed without disengaging the spring pin assembly 85.

Figure 10:
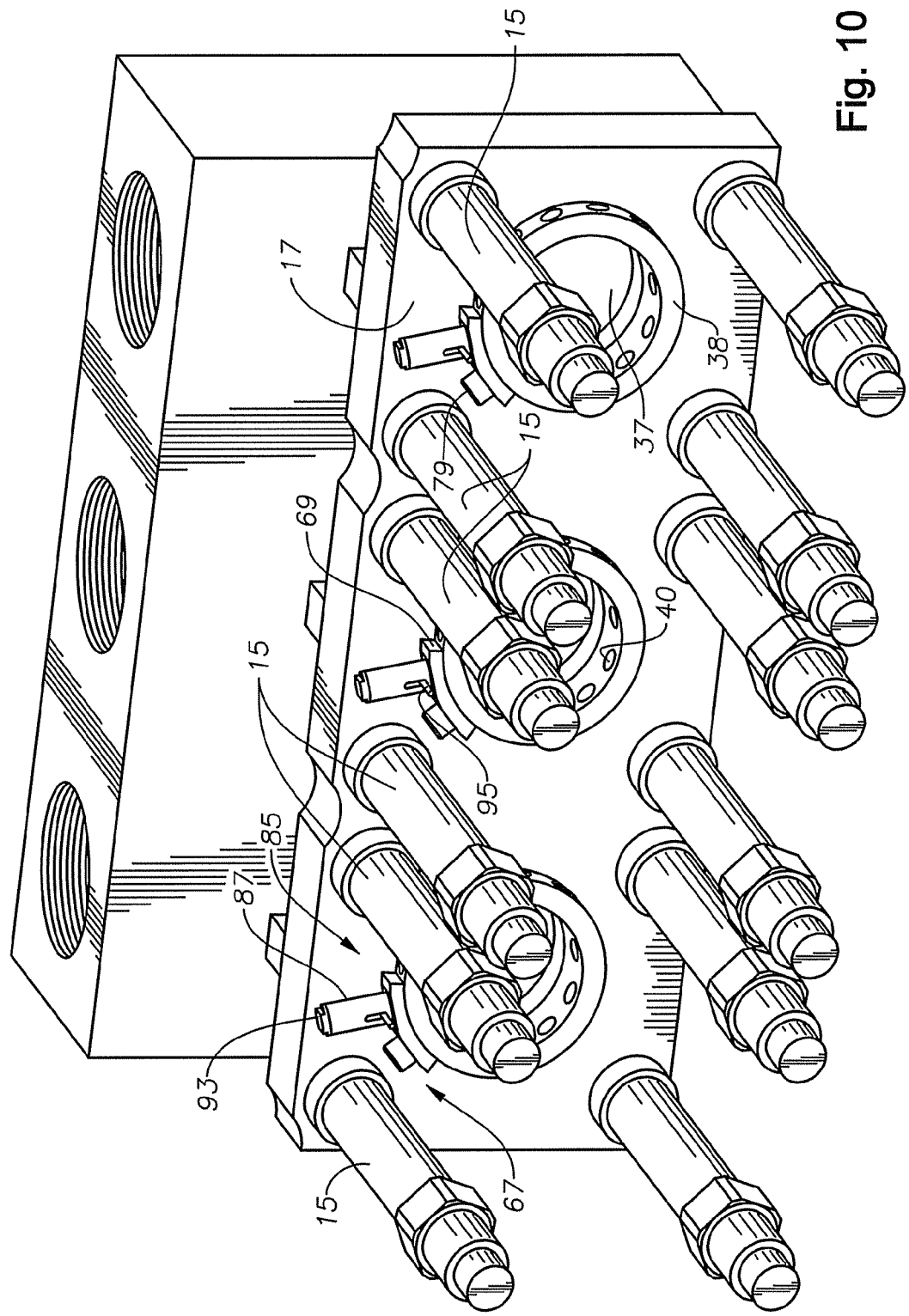
FIG. 10 is a perspective view of a portion of a reciprocating pump assembly in accordance with the present disclosure, with a packing nut lock installed and in an engaged position, and in contact with a stay rod.

Referring to FIG. 10, the spring pin assembly 85, and in particular, the collar 87 and the retaining cap 95, extend radially outward from the center of the packing bore 37 by a distance that is greater than or equal to the distance from the center of the packing bore to the stay rod 15. If the packing nut 38 begins to rotate relative to the housing 17, the spring pin assembly 85 makes contact with the stay rod 15, thereby preventing the packing nut lock 67 from rotating relative to the housing 17, and thus, also preventing the packing nut 38 from rotating any further relative to the housing 17. As a result, the packing nut lock 67 prevents the packing nut 38 from loosening and backing out of the packing bore 37.

Referring to FIGS. 11 and 12, in an alternate embodiment, a packing nut lock 121 is comprised of a main body 123 having a generally elongate, arcuate shape. In this alternate embodiment, the main body 123 generally subtends an angle of about one sixth of a circle and has a top surface 125 and a bottom surface 127. The bottom surface 127 of the main body 123 is substantially geometrically complimentary to the rim of the packing nut 38 and is adapted to be in abutting contact with a portion of the outer diameter of the rim of the packing nut 38. An aperture 131 is located in and extends through an end portion of the main body 123, with the aperture 131 extending from the top surface 125 through to the bottom surface 127. In this alternate embodiment, a fixed cylindrical pin 133 having an upper concave portion 135 with a lesser diameter than a lower portion 137, extends from the bottom surface 127 of the main body 123, opposite the end portion of the main body 123 through which the aperture 131 extends. In this alternate embodiment, the cylindrical pin 133 is cast as one member with the main body 123. However, in additional embodiments, the cylindrical pin 133 may be welded to the main body 123, or may be connected to the main body 123 by other means. The fixed cylindrical pin 133 is adapted to be inserted into one of the holes 40 that extend along the outer diameter of the rim of the packing nut 38 when the packing nut lock 121 is engaged.

A spring pin assembly 139 is connected to the top surface 125 of the main body 123, above the aperture 131. Referring to FIGS. 13 and 14, the spring pin assembly 139 is comprised of a collar 141, a center pin 143, a resilient member or spring 145, and a handle 147. In this embodiment, the collar 141 is a hollow bodied cylindrical member having a closed end 149 and an open end 151. The open end 151 of the collar 141 is aligned with the aperture 131 in the main body 123. In this alternate embodiment, the collar 141 is welded to the main body 123. However, in additional embodiments, the collar 141 may be cast as one member with the main body 123, or may be connected to the main body 123 by other means. An elongated aperture or slot 153 is located in and extends through the cylindrical collar 141 along a portion of its outer surface.

The center pin 143 is a cylindrical member having a diameter that is slightly less than the inner diameter of the collar 141, such that the center pin 143 is positioned within the collar 141. In this embodiment, a threaded aperture 155 is located in and extends through a medial portion of the center pin 143, substantially perpendicular to the axis of the center pin 143. An end portion 157 of the center pin 143 is adapted to be inserted into one of the holes 40 that extend around the outer diameter of the rim of the packing nut 38 when the packing nut lock 121 is engaged.

In this embodiment, the handle 147 is cylindrical and has threats located in the exterior surface of one of its ends 159. The threaded end 159 of the handle 147 threateningly engages the threaded aperture 155 in the medial portion of the center pin 143, thereby connecting the handle 147 and the center pin 143. The handle 147 extends radially outward from the center pin 143 before passing through the elongated aperture or slot 153 in the collar 141. The handle 147 extends a desired distance radially outward from the collar 141. The handle 147 is adapted to move vertically within the aperture 153 of the collar 141 to thereby move the center pin 143, and in particular, the end portion 157, from an engaged position to a disengaged position.

In this embodiment, the spring 145 is positioned within the collar 141 between the closed end 149 of the collar 141 and the center pin 143. The spring 145 acts to bias the center pin 143 in an engaged position, with the end portion 157 of the center pin 143 extending fully outward through the aperture 131 in the main body 123 (FIGS. 11 and 12).

In operation, the alternate embodiment packing nut lock 121 is installed on the reciprocating pump 12 and engaged/disengaged with the packing nut 38 just as for the first embodiment of a packing nut lock 67 described herein.

Figure 15:
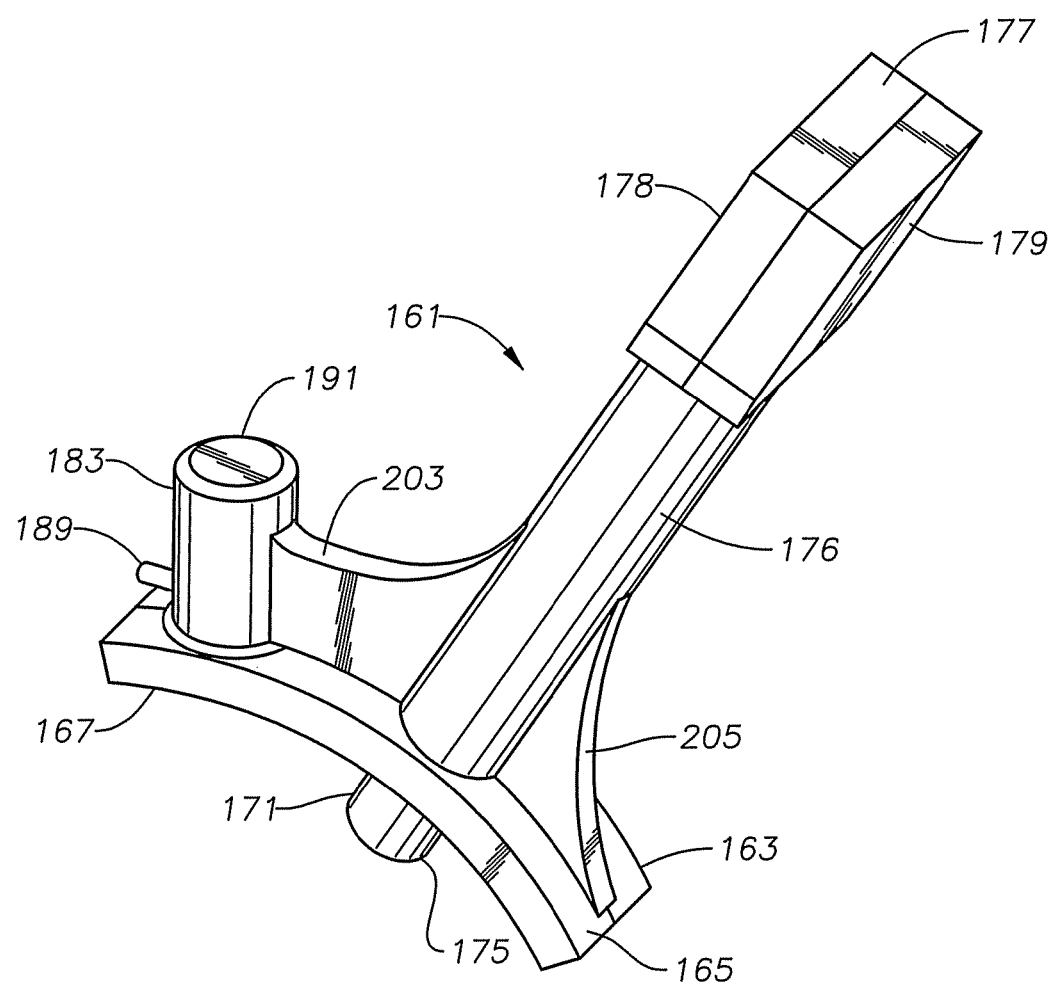
FIG. 15 is a perspective view of a packing nut lock and tool in accordance with an alternate embodiment of the present disclosure.
Figure 16:
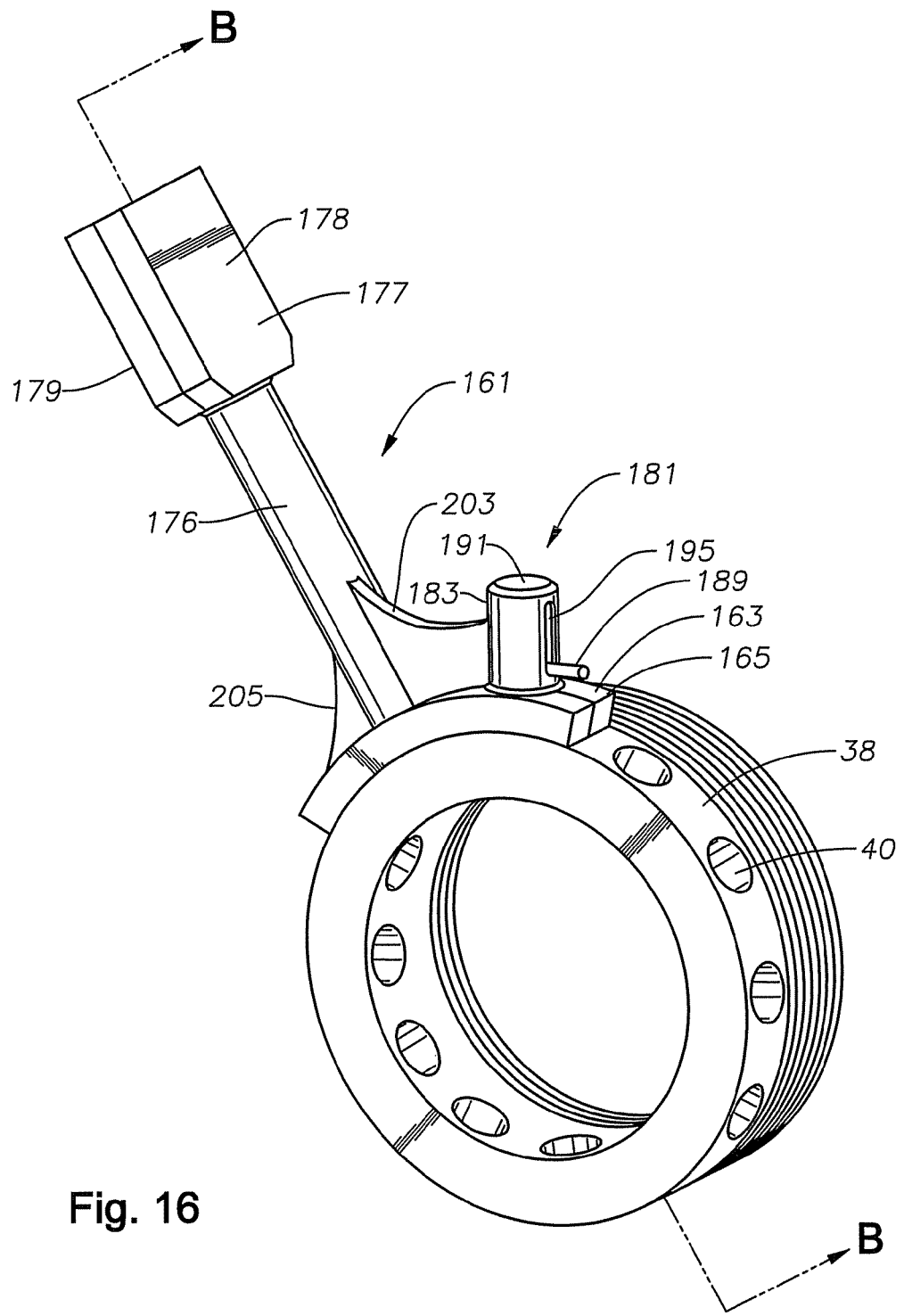
FIG. 16 is an additional perspective view of the packing nut lock and tool of FIG. 15, connected to a packing nut.
Figure 17:
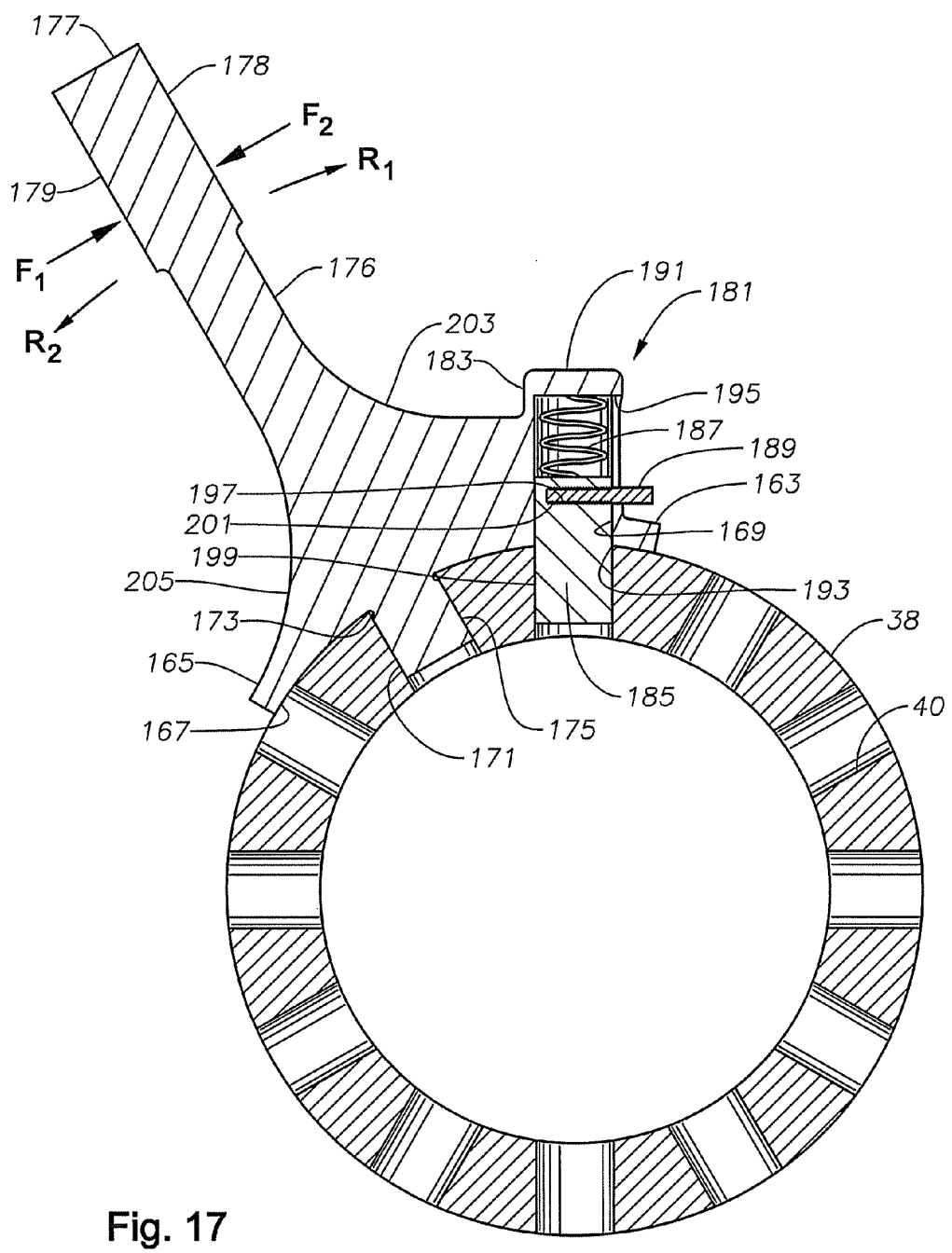
FIG. 17 is a sectional view of the packing nut lock and tool taken along the line B-B of FIG. 16.

Referring to FIGS. 15 through 17, in an alternate embodiment, a packing nut lock and tool 161 is comprised of a main body 163 having a generally elongate, arcuate shape. The packing nut lock and tool 161 of this alternate embodiment may be employed similarly to the packing nut locks 67, 121 of the aforementioned embodiments set forth herein. The packing nut lock and tool 161 of this alternate embodiment may also be utilized with other portions of the reciprocating pump 12. For example, the packing nut lock and tool 161 may be utilized with the packing nut 38, a discharge flange, a gauge port, or any item that incorporate holes or apertures on the outer diameter of the rim of the item. For illustration purposes only, the packing nut lock and tool 161 shown in FIG. 15 will be discussed in relationship to the packing nut 38.

In this alternate embodiment, the main body 163 of the packing nut lock and tool 161 generally subtends an angle of around one fifth of a circle and has a top surface 165 and a bottom surface 167. The bottom surface 167 of the main body 163 is substantially geometrically complimentary to the rim of the packing nut 38 and is adapted to be in abutting contact with a portion of the outer diameter of the rim of the packing nut 38. Referring to FIG. 17, an aperture 169 is located in and extends through an end portion of the main body 163, with the aperture 169, extending from the top surface 165 through to the bottom surface 167. In this alternate embodiment, a fixed cylindrical pin 171 having an upper concave portion 173 with a lesser diameter than a lower portion 175, extends from the bottom surface 167 of the main body 163, opposite the end portion of the main body 163 through which the aperture 169 extends. In this alternate embodiment, the cylindrical pin 171 is cast as one member with the main body 163. However, in additional embodiments, the cylindrical pin 171 may be welded to the main body 163, or may be connected to main body 163 by other means. The fixed cylindrical pin 171 is adapted to be inserted into one of the holes 40 that extend along the outer diameter of the rim of packing nut 38 when the packing nut lock and tool 161 are engaged.

A cylindrical arm 176 extends from the top surface 165 of the main body 163 of the packing nut lock and tool 161, just above the fixed cylindrical pin 171. In this embodiment, the cylindrical arm 176 is cast as one member with the main body 163. However, in additional embodiments, the cylindrical arm 176 may be welded to the main body 163, or may be connected to the main body 163 by other means. In this embodiment, a substantially rectangular engagement member 177 is connected to the end of the cylindrical arm 176, opposite the main body 163 of the packing nut lock and tool 161. The substantially rectangular engagement member 177 has two substantially planar contact surfaces 178, 179 on opposite sides of and parallel to one another. The planar contact surfaces 178, 179 extend in a plane that intersects and is substantially perpendicular to the arc of the main body 163. The planar contact surface 178, 179 are adapted to act as a contact point for a force to be exerted on the packing nut lock and tool 161, for example, the force of a sledge hammer.

A spring pin assembly 181 is connected to the top surface 165 of the main body 163, above the aperture 169. Referring to FIG. 17, the spring pin assembly 181 is comprised of a collar 183, a center pin 185, a resilient member or spring 187, and a handle 189. In this embodiment, the collar 183 is a hollow bodied cylindrical member having a closed end 191 and an open end 193. The open end 193 of the collar 183 is aligned with the aperture 169 in the main body 163. In this alternate embodiment, the collar 183 is cast as one member with the main body 163. However, in additional embodiments, the collar 183 may be welded to the main body 163, or may be connected to the main body 163 by other means. An elongated aperture or slot 195 is located in and extends through the cylindrical collar 183 along a portion of its outer surface.

The center pin 185 is a cylindrical member having a diameter that is slightly less than the inner diameter of the collar 183, such that the center pin 185 is positioned within the collar 183. In this embodiment, a threaded aperture 197 is located in and extends through a portion of the center pin 185, substantially perpendicular to the axis of the center pin 185. An end portion 199 of the center pin 185 is adapted to be inserted into one of the holes 40 that extend along the outer diameter of the rim of the packing nut 38 when the packing nut lock and tool 161 is engaged.

In this embodiment, the handle 189 is cylindrical and has threads located in the exterior surface of one of its ends 201. The threaded end 201 of the handle 189 threadingly engages the threaded aperture 197 in the portion of the center pin 185, thereby connecting the handle 189 and the center pin 185. The handle 189 extends radially outward from the center pin 185 before passing through the elongated aperture or slot 195 in the collar 183. The handle 189 extends a desired distance radially outward from the collar 183. The handle 189 is adapted to move vertically within the aperture 195 of the collar 183 to thereby move the center pin 185, and in particular, the end portion 199, from an engaged position to a disengaged position.

In this embodiment, the spring 187 is positioned within the collar 183 between the closed end 191 of the collar 183 and the center pin 185. The spring 187 acts to bias the center pin 185 in an engaged position, with the end portion 199 of the center pin 185 extending fully outward through the aperture 169 in the main body 163. In this embodiment, a rib or brace structure 203 extends between the collar 183, the upper surface 165 of the main body 163, and the cylindrical arm 176. In this alternate embodiment, the rib or brace structure 203 is cast as one member with the main body 163, collar 183, and cylindrical arm 176. However, in additional embodiments, the brace structure 203 may be welded to the main body 163, collar 183, and cylindrical arm 176, or may be connected by other means. In this embodiment, a rib or brace structure 205 extends between the upper surface 165 of the main body 163 and the cylindrical arm 176. In this alternate embodiment, the rib or brace structure 205 is cast as one member with the main body 163 and with the cylindrical arm 176. However, in additional embodiments, the brace structure 205 may be welded to the main body 163 and to the cylindrical arm 176, or may be connected by other means.

In operation, the alternate embodiment packing nut lock and tool 161 is installed on the reciprocating pump 12 and engaged/disengaged with the packing nut 38 just as for the first embodiment of a packing nut lock 67 and also for the additional embodiment of a packing nut lock 121. However, in the packing nut lock and tool 161 of this embodiment, the cylindrical arm 176 and the substantially rectangular engagement member 177 extend radially outward from the center of the packing bore 37 a distance that is greater than or equal to the distance from the center of the packing bore to the stay rod 15 (items illustrated in FIG. 10 may be referred to). If the packing nut 38 begins to rotate relative to the housing 17, the cylindrical arm 176 and the substantially rectangular engagement member 177 may make contact With the stay rod 15, thereby preventing the packing nut lock and tool 161 from rotating relative to the housing 17, and thus, also preventing the packing nut 38 from rotating any further relative to the housing 17. As a result, the packing nut lock and tool 161 prevents the packing nut 38 from loosening and backing out of the packing bore 37.

In operation, the alternate embodiment packing nut lock and tool 163 may also be utilized to tighten and/or loosen an item that incorporate holes or apertures on the outer diameter of the rim of the item. For example, generally referring to FIG. 16, a spanner (not shown) may be inserted into holes or apertures 40 on the outer diameter of the rim of the packing nut 38, and the packing nut 38 may be tightened. However, referring to FIG. 17, to ensure that the packing nut 38 is securely tightened, the packing nut lock and tool 161 may be connected to the packing nut 38 by engaging the fixed cylindrical pin 171 and the center pin 185 with holes 40 in the packing nut 38. As discussed With respect to the packing nut lock 67, the center pin 185 is first retracted into the collar 183 using the handle 189 as the fixed cylindrical pin 171 is inserted into one of the holes 40 of the packing nut 38. Once the fixed cylindrical pin 171 is positioned within one of the holes 40 of the packing nut 38, the handle 189 of the center pin 185 is released, and the end portion 199 of the center pin 185 engages another hole 40 in the packing nut 38, thereby securely connecting the packing nut lock and tool 161 to the packing nut 38. Once the packing nut lock and tool 161 is connected to the packing nut 38, a force may be applied to one of the planar contact surfaces 178, 179 of the substantially rectangular engagement member 177. The force is applied at an angle substantially perpendicular to the planar contact surfaces 178, 179, thus resulting in a force that causes the packing nut lock and tool 161 to rotate about the axis of the packing bore. For example, the force may be applied by an operator engaging the planar contact surfaces 178, 179 with a sledge hammer. The force can be applied to the contact surfaces 178, 179 until the packing nut lock and tool 161 rotates a desired amount, and thus, the packing nut 38 is either tightened or loosed to the operator's liking. Depending upon Whether the packing nut 38 is to be tightened or loosed, the force is applied to the corresponding contact surface 178, 179 of the packing nut lock and tool 161 to achieve the desired result, as illustrated in FIG. 17 by the items F1 and F2 illustrating the direction of the force applied, and the corresponding directions of rotation, R1 and R2.

The foregoing embodiment(s) described provide several operational advantages aimed at preventing backing off of the packing nut. When in place, the packing nut locks of the present disclosure maintain the necessary pressure between the plunger and the packing, and help to prevent the packing bore from leaking due to movement of the packing and backing off of the packing nut. The foregoing embodiments also provide a device and method for tightening and loosening a threaded nut in a threaded bore.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "upward" and "downward" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the disclosure, and alterations, modifications, additions and/or changes can be made thereto without departing from the scope and spirit of the disclosed embodiments, the embodiments being illustrative and not restrictive.

Furthermore, disclosures have been described in connection with what are presently considered to be the most practical and preferred embodiments, it is to be understood that the disclosure is not to be limited to the disclosed embodiments, but on the contrary, is intended to cover various modifications and equivalent arrangements included within the spirit and scope of the disclosure(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. An apparatus for preventing a threaded nut from unscrewing from a threaded bore of a device, the nut having a circular periphery containing two or more apertures, the apparatus comprising:

a body having a fixed pin rigidly secured to and extending from a bottom surface of the body, the fixed pin insertable into a first one of the two or more apertures of the nut;

a retainer affixed to the body, the retainer including a retractable pin extending from the bottom surface, the retractable pin movable between an engaged position, for positioning the retractable pin into a second one of the two or more apertures and securing the body to the threaded nut, and a retracted position, for removing the pin from the second one of the two or more apertures to facilitate removal of the body from the threaded nut, wherein the retractable pin has an axis that is in the same plane and intersects the axis of the fixed pin;

a shank extending from a top surface of the body, the top surface opposite to the bottom surface of the body, the shank engaging a non-rotatable portion of the apparatus; and a resilient member housed within the shank and in engagement with the retractable pin to thereby bias the retractable pin.

2. The apparatus of claim 1, further comprising a substantially circumferentially planar surface on an outer end of the shank, opposite the body, the substantially circumferentially planar surface adapted to transfer a rotational force to the nut.

3. The apparatus of claim 1, wherein the retractable pin extends from the body at an angle relative to the fixed pin.

4. The apparatus of claim 3, wherein the fixed pin and the retractable pin are at an acute angle to one another.

5. The apparatus of claim 3,
wherein the resilient member biases the retractable pin toward the engaged position.

6. The apparatus of claim 3, wherein the retractable pin has an axis that intersects the axis of the fixed pin.

7. The apparatus of claim 1, wherein the retractable pin is movable along an axis that intersects an axis of the fixed pin, and the axis of the fixed pin and the axis of the retractable pin are located in a single plane.

8. An apparatus for preventing a threaded nut from unscrewing from a threaded bore of a device, the nut having a circular periphery containing a plurality of apertures, the apparatus comprising:
a body having a bottom surface;
a first pin extending from the bottom surface and configured to insert into one of the apertures of the nut and a second pin extending from the bottom surface at an angle relative to the first pin for engaging another aperture in the nut, the first pin rigidly attached to the body and the second pin retractable relative to the body;
the second pin having an axis that intersects the axis of the first pin, and the axis of the first pin and the axis of the second pin being located in a single plane; and
a shank extending outward from and rigidly attached to a top surface of the body opposite to the bottom surface and adapted to engage a non-rotatable portion of the device, the shank including a resilient member and in engagement with the second pin to thereby bias the retractable pin.

9. The apparatus of claim 8, wherein the axes of the pins are at an acute angle to one another.

10. The apparatus of claim 8, further comprising a substantially circumferentially planar surface on an outer end of the shank, opposite the body, the substantially circumferentially planar surface adapted to transfer a rotational force to the nut.

11. An apparatus for preventing a threaded nut from unscrewing from a threaded bore of a device, the nut having a circular periphery containing a plurality of apertures, the apparatus comprising:
a body having a first pin extending therefrom and configured to insert into one of the apertures of the nut and a second pin extending from the body at an angle relative to the first pin for engaging another aperture in the nut, the first pin rigidly attached to the body and the second pin retractable relative to the body;
the second pin having an axis that intersects the axis of the first pin, and the axis of the first pin and the axis of the second pin being located in a single plane;
a shank extending outward from and rigidly attached to the body and adapted to engage a non-rotatable portion of the device; and
a resilient member housed within the shank and in engagement with the second pin to thereby bias the second pin toward an engaged position.

12. A reciprocating pump assembly, the assembly comprising:
a reciprocating pump having a housing;
a threaded nut in engagement with a threaded bore in the reciprocating pump housing;
an apparatus for retaining the threaded nut in engagement with the threaded bore in the reciprocating pump housing, the apparatus comprising:
a body having a first pin non-rotatably attached to and extending from a bottom surface of the body for engagement with the threaded nut;
a second pin secured to the body and movable relative to the body along an axis between an engaged position, where at least a portion of the second pin engages the threaded nut to secure the body to the threaded nut, and a retracted position, to facilitate separation of the body from the threaded nut;
a shank extending from a top surface of the body opposite to the bottom surface and adapted to engage a non-rotatable portion of the reciprocating pump to prevent rotation of the body relative to the pump housing, which in turn, prevents the threaded nut from rotating relative to the pump housing, when the second pin is in the engaged position, wherein the axis of the second pin intersects the axis of the first pin, and the axis of the first pin and the axis of the second pin are located in a single plane; and
a resilient member disposed in the shank, the resilient member biasing the second pin toward the extended position.

13. The apparatus of claim 12, wherein the first and second pins are at an acute angle to one another.

14. A method for preventing a threaded nut from unscrewing from a threaded bore of a device, the nut having a circular periphery containing a plurality of apertures, the method comprising:
attaching a lock to the threaded nut, wherein the lock includes a body having a bottom surface, a first fixed pin and a second movable pin extending from the bottom surface, and a shank rigidly secured and extending from a top surface of the lock opposite to the bottom surface, a resilient member disposed in the shank and biasing the second movable pin from a retracted position to an extended position;
inserting the first fixed pin into a first one of the plurality of apertures of the nut;
inserting the second movable pin into a second one of the plurality of apertures of the nut, wherein the retractable pin has an axis that intersects the axis of the fixed pin, and the axis of the fixed pin and the axis of the retractable pin are located in a single plane; and
transferring any forces due to a tendency of the nut to unscrew to a fixed portion of the device from the shank.

15. The method of claim 14, wherein the second movable pin further includes a handle to retract the second movable pin for disengaging the second one of the plurality of apertures.

* * * * *